March 29, 1932.  E. EGER  1,851,758
BASE FOR OPENINGS IN YIELDABLE MATERIAL
Filed Dec. 16, 1929
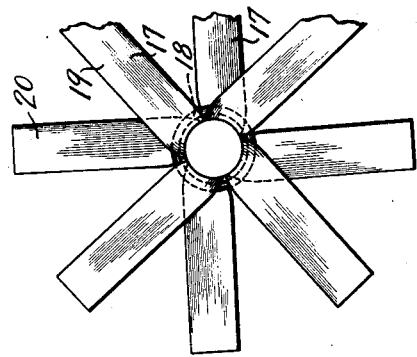
Fig. 4.
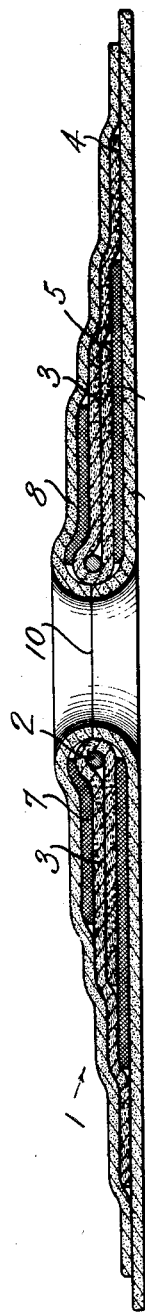
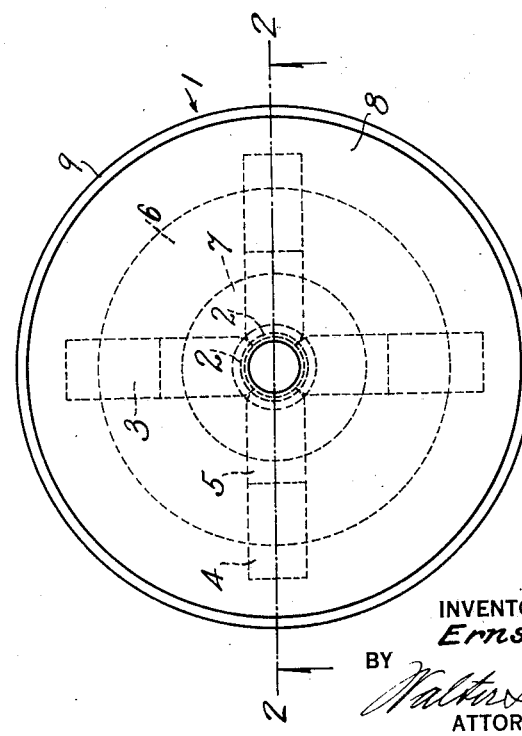
Fig. 3.
Fig. 1.
INVENTOR
*Ernst Eger*
BY
ATTORNEY Patented Mar. 29, 1932

1,851,758

UNITED STATES PATENT OFFICE

ERNST EGER, OF DETROIT, MICHIGAN, ASSIGNOR TO MORGAN & WRIGHT, OF DETROIT, MICHIGAN, A CORPORATION OF MICHIGAN

BASE FOR OPENINGS IN YIELDABLE MATERIAL

Application filed December 16, 1929. Serial No. 414,346.

My invention relates to bases for openings in yieldable material, and more particularly to bases for valve stems and the like for insertion in bodies of rubber.

In providing openings in bodies of yieldable material, such as openings for valve stems and the like in rubber tubes, or other articles, difficulty has heretofore been experienced in preventing the extension or enlargement of openings initially prepared in the yieldable material. When pressure is applied to the yieldable material adjacent the opening for clamping an article, such as a valve stem in the opening, there is a tendency for the material adjacent the opening to flow or move under pressure, thereby tending to extend or enlarge the opening. When the material is of uncured form, such as unvulcanized rubber, and the temperature of the body is raised, as in a vulcanizing operation, the opening also tends to enlarge.

I provide a base for preserving the size of such openings in yieldable material. The base comprises a substantially inextensible member having an internal shape conforming to the opening in the yieldable material and of slightly greater dimensions. Anchoring strips are looped through the inextensible member and radiate outwardly from the member. A covering for the anchoring strips is provided which unites with the yieldable material surrounding the opening to be protected. It is to be understood that the anchoring strips may directly engage the yieldable material, if desired.

The covering material preferably extends internally of the inextensible member to provide an opening of substantially the diameter of the opening in the yieldable material. The presence of the inextensible member secured to the yieldable material prevents the enlargement of the opening in the latter. In the case of rubber, the base is vulcanized to the body of rubber having the opening therein. Upon the application of clamping pressure adjacent the opening in the yieldable material, the inextensible member resists certain of the forces, which would otherwise be expended in causing the outward flow of the material adjacent the opening.

The accompanying drawings illustrate certain preferred embodiments of the invention, in which Figure 1 is a plan view of a base embodying my invention;

Fig. 2 is a cross sectional view thereof, taken substantially along the section line 2—2 of Fig. 1;

Fig. 3 is a partial cross sectional view of a tube and base with a valve stem attached thereto; and Fig. 4 is a plan view of a modified ring and anchoring strip construction.

Referring to Figs. 1 and 2, a base 1 for retaining the shape of an opening in a body of yieldable material, an example of which is rubber, comprises a ring 2 of inextensible material. The ring 2 is preferably of metal, although substantially inextensible cords may be used. The shape of the member 2 conforms substantially to the shape of the desired opening in the body of yieldable material, although the internal dimensions of the member are somewhat greater than the dimensions of the opening to be protected.

Anchoring strips 3 are looped through the member 2 with the ends 4 extending outwardly beyond the ends 5 to provide uniform flexibility. The number of anchoring strips 3 may be varied as desired, four such strips being shown in Figures 1 and 2. A bonding and filler strip 6, in the form of a disc, is provided in engagement with the outer faces of the folded ends 5. The outer periphery of the disc 6 is preferably disposed intermediate the loop ends 5. That is, the looped ends 5 are staggered with the outer periphery of the lower disc 6. The inner diameter of the disc substantially corresponds to the diameter of the inextensible member 2, as shown in Fig. 2. An outer bonding and filler strip 7, in the form of a disc, is provided in engagement with the faces of the loop ends 4 adjacent the member 2. The outer periphery of the disc 7 is preferably disposed inwardly from the loop ends 5. The inner periphery of the disc 7 substantially corresponds to the diameter of the inextensible member 2. With this construction the bonding strips are bonded to the anchoring strips to retain a rigid relationship and to reinforce the area around the opening. Also the thickness of the anchoring strips and filler strips gradually decreases outwardly from the inextensible member 2.

Any form of fabric may be used for the anchoring strips 3. A suitable fabric is a rubberized cord fabric wherein the cords run parallel with the lengths of the strips. The discs 6 and 7 may also be made of any suitable fabric, although a rubberized fabric is preferred.

The outer surfaces of the base are provided with sheets 8 and 9 preferably in the form of discs of rubber somewhat similar to the composition of an ordinary tire tube. The sheet 9, which in use engages the yieldable body to be protected, is given a diameter to extend outwardly beyond the strip ends 4 and the periphery of the disc 8 on the outer face of the base. The inner peripheries of the discs 8 and 9 are of slightly less dimensions than those of the inextensible member 2. The inner ends of the discs are turned inwardly of the member 2 and brought together along a line 10 at substantially the center of the member 2.

The assembled base 1 is then subjected to a curing treatment, such as a vulcanizing operation when the materials of the strips 3, discs 6 and 7, and the coverings 8 and 9 are joined. This treatment embeds the inextensible member 2 in a body of fabric and rubber, thereby forming a unitary device. If the base is to be distributed separately from the material to which it is ultimately attached, the vulcanization of the base takes place before the base is attached to the material. If, however, the base is to be applied to a body of uncured rubber, the exposed surface of the cover 9 may be coated with cement, the base applied to the body of rubber and the entire vulcanization takes place in one operation. In some cases when both the base and body of rubber are unvulcanized, cement need not be used. When the base is previously vulcanized and it is desired to attach it to a body of rubber, the exposed face of the cover 9 is covered with cement and the base is vulcanized to the body of rubber. Where it is desired to attach the base to material other than rubber, the exposed surface of the cover 9 is treated with a suitable adhesive and the base is applied to the material with the inextensible member 2 in position to protect an opening. The base and material may be subjected to a heat treatment, if desired and in accordance with the nature of the material to which the base is attached.

Referring to Fig. 3, the base 1 is bonded to a rubber tube 11 having an opening 12 therein. A valve stem 13 having a flange 14 and a clamping nut 15 extends through the opening 12 with the flange 14 disposed internally of the tube 11. The nut 15 engages the outer face of the base 1. Upon the application of pressure to the tube 11 and base 1 to seal the joint at the opening 12, the tendency of the tube 11 to flow away from the valve stem and thereby enlarge the opening 12 is resisted by the inextensible member 2 in the base 1, thereby permitting the application of sufficient pressure to the tube and base to insure a tight joint.

Referring to Fig. 4, I have illustrated a slightly different embodiment of the invention in which anchoring strips 17 are looped through an inextensible member 18 with the ends 19 and 20 of each strip 17 disposed in diverging relation, rather than in the overlapping relation shown in Figs. 1 and 2. It is to be understood that this form of the invention is provided with filling strips and covering discs in the manner described in connection with the form of the invention shown in Figs. 1 and 2.

While I have illustrated and described certain preferred embodiments of the invention, it is to be understood that it may be otherwise embodied in the spirit of the invention and the scope of the appended claims.

Having thus described my invention, what I claim and desire to protect by Letters Patent is:

1. A base for protecting an opening in a body of yieldable material comprising a substantially inextensible ring-like member positioned within the peripheries of associated compressing members, anchoring strips looped therethrough, a pair of fibrous filler sheets extending outwardly from said member at opposite sides of said strips, the ends of said strips extending beyond the upper sheet and being staggered with the edge of the lower sheet, and a covering for said member, strips and sheets extending through said member, said covering being constituted by sheets of yieldable material disposed on opposite sides of and beyond the outer margins of said strips and sheets and extending inside said member to constitute a seal, whereby the base gradually tapers in cross-section from the opening to its outer periphery.

2. A base for protecting a valve opening in a rubber tube comprising a substantially inextensible ring-like member disposed within the peripheries of a valve flange and clamping means, anchoring strips looped therethrough, a pair of fabric discs extending outwardly from said member at opposite sides of said strips, the ends of said strips extending beyond the upper disc and being staggered with the edge of the lower disc, and a covering for said member, strips and discs extending through said member, said covering being constituted by sheets of rubber disposed on opposite sides of and beyond the outer margins of said strips and discs and extending inside said member where they are joined to constitute a seal with a valve stem extending through said opening, whereby the base gradually tapers in cross-section from the opening to its outer periphery.

Signed at Detroit, in the county of Wayne and State of Michigan, this 6th day of December, 1929.

ERNST EGER.